United States Patent Office 3,453,275
Patented July 1, 1969

---

3,453,275
PROCESS FOR THE POLYMERIZATION OF PERFLUOROALKYL-SUBSTITUTED TRIAZINES AND PRODUCTS THEREOF
George A. Grindahl and Ogden R. Pierce, Midland, Mich., assignors to Dow Corning Corporation, Midland, Mich., a corporation of Michigan
No Drawing. Continuation-in-part of application Ser. No. 535,694, Mar. 21, 1966. This application June 12, 1967, Ser. No. 645,523
Int. Cl. C07d *55/50;* C08g *33/02*
U.S. Cl. 260—248                                    7 Claims

ABSTRACT OF THE DISCLOSURE

Polymeric triazines are made by condensing bromo- or iodo-perfluorotriazines with mercury at temperatures of 30° C. or above, alternatively in the presence of ultraviolet light. For example, .5 mol of

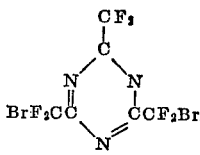

was heated at 200° C. for 16 hours with 1.36 mols of Hg to give a polymer of the formula

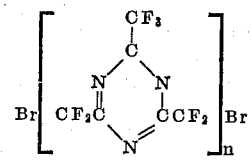

which has excellent thermal and oxidative stability.

---

This application is a continuation-in-part of application Ser. No. 535,694, filed Mar. 21, 1966, by George A. Grindahl and Ogden R. Pierce, now abandoned.

This application relates to a process for the preparation of polymeric perfluoroalkyl-substituted triazines, which have utility as thermally and oxidatively stable elastomer ingredients, sealants, resins, fibers, films, oils, and coatings. The higher polymeric triazines exhibit excellent solvent resistance.

The process of this application comprises condensing a triazine reactant of the formula

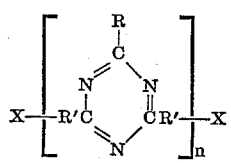

by heating it at a temperature of at least 30° C. in the presence of mercury, where $n$ has a value of at least 1, R is a monovalent fluorocarbon radical of no more than 12 carbon atoms, R' is a divalent perfluoroalkylene radical and X is bromine or iodine.

The temperature at which the condensation takes place varies depending on the reaction conditions. When ultraviolet light is employed reaction occurs at 30° C. or above, preferably 50° C. or above. When heat alone is used the reaction goes best at 150° C. or above. Of course, the reaction temperature should be below the decomposition temperature of the triazine. In the absence of ultraviolet light the reaction temperature is generally 200° to 300° C. This process can be performed at any pressure and is preferably carried out in an inert atmosphere.

As can be seen from the above formula the starting triazines can contain one or more triazine rings. Thus, where $n$ is 1 the starting material will have the formula

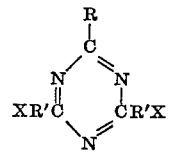

but where $n$ is 2, the starting material will have the formula

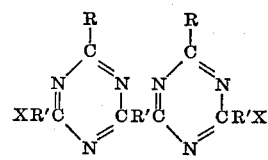

and where $n$ is 4, the formula is

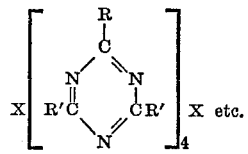

R can be any radical as described above, e.g., perfluoroalkyl such as trifluoromethyl, iso(heptafluoropropyl), perfluoroisobutyl, perfluorooctyl, perfluorododecyl, or perfluorocyclohexyl; fluoroaliphatic radicals such as trifluorovinyl, pentafluoroallyl, 4-perfluorohexenyl, and perfluorocyclohexenyl; or any aryl-containing radical such as pentafluorophenyl, nonafluoroxenyl heptafluorotolyl, heptafluoronaphthyl, and heptafluorobenzyl. R is preferably trifluoromethyl or another perfluoroalkyl radical, but the presence of small amounts of fluoroolefinic radicals can be desirable if one wishes to crosslink the triazine polymers at a later time.

R' can be any perfluoroalkylene radical such as difluoromethylene, —CF$_2$CF$_2$—, —(CF$_2$)$_4$,

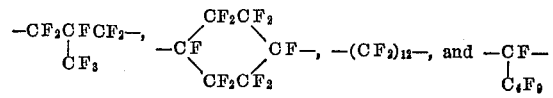

It is preferred for R' to be difluoromethylene.

The term "condensing" refers to the fusion of the triazine reactant into a polytriazine of higher molecular weight through the removal of X groups and the reaction of the remaining —R' groups with each other to form —R'R'— groups.

The main advantage of the process of this application is that it is the first process which can yield purely linear polytriazines when a pure triazine reactant containing two X groups per molecule is used. These materials have greatly improved handling properties over crosslinked polytriazines.

When a branched chain polymer or a polymer of limited molecular weight is required, the above triazine reactant can be cocondensed with a minor amount, usually no more than 20 mol percent, of one or more triazine compounds of either the formula

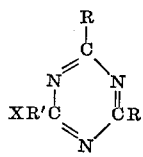

or the formula

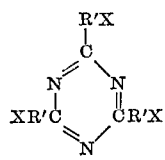

where R, R', and X are as defined above. Compounds of the first formula serve to terminate the polymerization at the point where it reacts, while compounds of the second formula serve as chain-branching units.

The process of this application therefore provides polytriazines of predictable and controllable structure.

The monotriazines used herein can be prepared from nitriles of the formula NCR'X and NCR, where R, R', and X are defined above, by reacting them under pressure at a temperature of about 150° C. in the presence of silver oxide, HCl, or tetraphenyl tin. When the reaction mixture contains two molars parts of NCR'X and one molar part of NCR, the major product will be

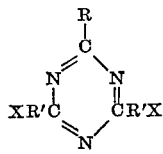

which can be purified by distillation.

Other triazines which are useful in the process of this application can be prepared in good yield by altering the proportions of the above nitriles in the reaction mixture.

An alternative method of preparing the monotriazines having one ring is by the series of reactions

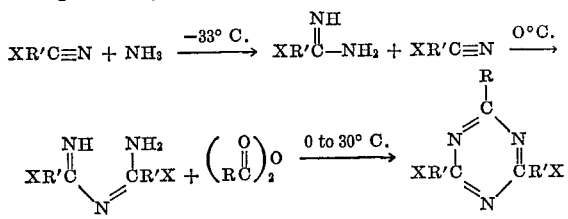

Iododifluoroacetonitrile and homologues thereof can be prepared in accordance with U.S. application Ser. No. 467,110, filed June 25, 1965, by William X. Bajzer.

Other nitriles which are represented by the above formulae are known to the art, and methods of their preparation involve known processes and obvious modifications thereof.

This invention also relates to triazines containing two rings of the formula

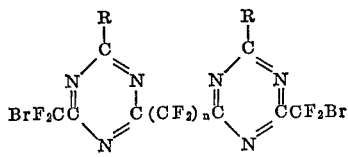

in which $n$ is an integer from 3 to 12 inclusive and R is as above defined. These bicyclic triazines give particularly desirable polymers when condensed with Hg as above described.

Polytriazines of low molecular weight can be prepared from the above monotriazines by heating them in a solvent with copper or zinc at about 300° C., forming halogen-endblocking polytriazines containing up to about 20 triazine units.

The process of this invention results in the production of a bromide or iodide of mercury as a byproduct. The amount of mercury present during the reaction is not critical, but an excess of mercury over the amount required to react with all the bromide or iodine which is present yields the most favorable results.

It is generally not desirable to include diluents such as solvents or oils into the reaction mixture, as the molecular weight of the product is decreased thereby.

The following examples are illustrative only and should not be construed as limiting the invention, which is properly delineated in the appended claims.

Example 1

To 20.7 g. (0.051 mole) of 2,4-bis(bromodifluoromethyl)-6-trifluoromethyl-1,3,5-triazine, there was added 272.4 g. (1.36 moles) of mercury. This was sealed in a tube under a partial vacuum and heated at 175° C. for 2 hours and at 200° C. for 16 hours while agitating the tube.

The tube was cooled, and the contents were found to have turned into an elastomeric mass.

The product was washed with hexafluoro-m-xylene, aqueous HCl, diethyl ether, and acetone consecutively. The remaining insoluble product (3.19 g.) was a brown solid which was pliable but nonmelting at temperatures of above 100° to 350° C. yet which exhibited no change after heating in the air for 6 hours at 350° C.

This product was determined to be a polymer of the unit formula

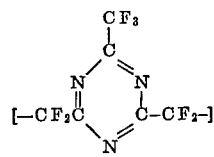

having apparently an average of about 350 of such units per molecule and a molecular weight of about 85,000. The determination of the molecular weight was based on a bromine analysis, assuming that the product molecules were bromine-endblocked on each end.

The hexafluoro-m-xylene wash was evaporated to yield a tan solid (9.1 g.) having a melting range of about 130° to 220° C., and which exhibited fiber-forming properties. This product was determined to be a mixture of polymers similar to the one above, but of lower molecular weight.

Example 2

To 25.23 g. (0.062 mole) of the triazine reactant of Example 1 there was added 330.15 g. (1.645 moles) of mercury. This was heated as in Example 1 at 155° C. for 16 hours. The product was a liquid mixture of the following polymers, dissolved in the remaining triazine monomer, plus the mercury and mercuric bromide byproduct:

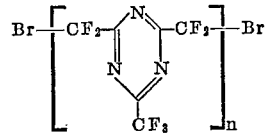

where $n$ has a value of 2, 3 and 4. The product where $n$ equals 2 had a melting point of 35.5° to 36° C.; where $n$ equals 3, the melting point was 70° to 72° C.; and where $n$ equals 4, the melting point was 89° to 90° C., all measured at atmospheric pressure.

Equivalent results can be obtained upon irradiation of the above reaction mixture under a partial vacuum with agitation in a quartz tube with an intense source of ultraviolet light for 48 hours.

Example 3

A mixture of 3.16 g. of

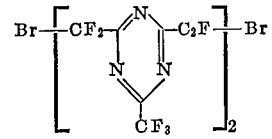

and 13.5 g. of mercury was heated under a nitrogen atmosphere at 330° C. for four hours. A pliable, resinlike, clear, amber polymer of the above dimer was recovered which showed stability in air at temperatures up to 340°C.

Further heating of the reaction mixture yields rigid polymers of higher molecular weight, particularly when extra mercury is added.

Example 4

When 2 molar parts of iododifluoroacetonitrile and one molar part of trifluoroacetonitrile are heated at 150° C. at 10 p.s.i. in the presence of 0.2 molar part of tetraphenyl tin, a triazine of the formula

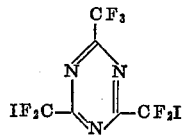

is produced in liberal yield.

When one molar part of a pure distillation fraction of the above triazine and 3 molar parts of mercury are heated at 190° C. for 18 hours, a high polymeric product that is insoluble in hexafluoro-m-xylene, and which is similar to the high polymeric product of Example 1, is formed.

Example 5

When 2 molar parts of $BrCF_2CF_2CN$ and one molar part of $C_5F_{11}CN$ are heated at 175° C. at 100 p.s.i. in the presence of 1 mole of HCl, a liberal yield of (a)

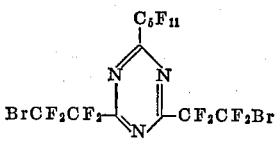

is formed, as well as smaller yields of (b)

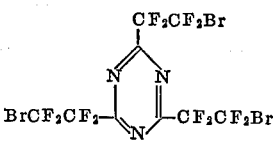

and (c)

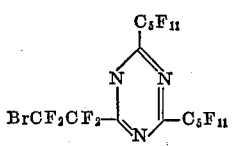

When 10 molar parts of (a), 0.1 molar part of (b), and 0.1 molar part of (c) are heated in a bomb for 20 hours at 275° C. with 30 molar parts of mercury, with agitation, a resinous terpolymer of (a), (b), and (c) is formed.

Example 6

When 30 molar parts of (a)

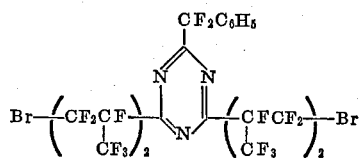

and 1 molar part of (b)

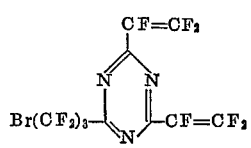

are heated with 65 molar parts of mercury at 250° C. for 24 hours in an agitated bomb, a copolymer of (a) and (b) which is a curable plastic is formed.

Example 7

When 10 g. of

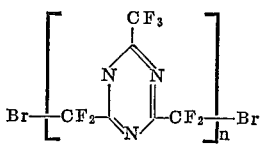

where $n$ equals 4, is heated with 20 g. of mercury in a bomb at 300° C., further polymerization takes place, forming polytriazines of higher molecular weight.

Equivalent results are obtained when the reactant is a similar polytriazine where $n$ has an average value of 10 or the reactant is a mixture of polytriazines where $n$ has a value of 35 to 40.

Example 8

77.7 g. of bromodifluoroacetonitrile was reacted with 8 g. of ammonia in 200 ml. of methylene chloride at −75° C. and then warmed to 0° C. to give bromodifluoroacetimidolyl-bromodifluoroacetamidine

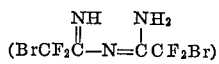

The solution was then treated at 0° C. with 363.2 g. of perfluoroctanoic anhydride dissolved in 100 ml. of ether. The acylated imidoylamidine formed a white precipitate. 105 g. of trifluoroacetic anhydride was added a 0° C. and the mixture was warmed to room temperature. The material was extracted with carbon tetrachloride and chromatographic separation of the extract give 2,4-bis(bromodifluoromethyl)-6-perfluoroheptyl-1,3,5-triazine

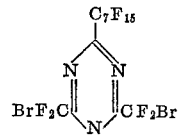

B.P. 230° C., $d^{25}$ 1.964 and $n_D^{25}$ 1.3713.

A mixture of 20 g. of this product and 120 g. of Hg was heated at 200° C. for 16 hours. Extraction of the residue with a fluorocarbon ether sold under the name FC–75 give the polymer

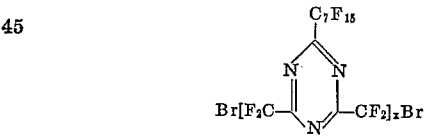

Example 9

Following the procedure of Example 8: bromotetrafluoropropionitrile was reacted with ammonia and the product so formed with trifluoroacetic anhydride to give 2,4-bis(β-bromotetrafluoroethyl)-6-trifluoromethyl - 1,3,5-triazine

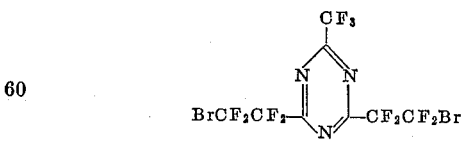

B.P. 93° C. at 23 mm., $n_D^{25}$ 1.3872.

20 g. of this compound was mixed with 610 g. of Hg and irradiated with ultraviolet light at 100° C. After 72 hours the mixture was cooled, the excess Hg removed and the residue extracted with several small portions of isopropyl acetate. Distillation of the extract gave a dark brown solid polymeric residue of the formula

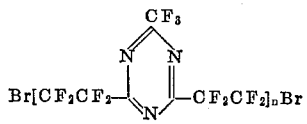

Example 10

94 g. of bromodifluoroacetonitrile was added over a 30 minute period to 150 ml. of anhydrous $NH_3$. The ammonia was allowed to evaporate overnight. The residue was diluted with 400 ml. of anhydrous methylene chloride and cooled to $-70°$ C. 58 g. of trifluoroacetonitrile was then added over a period of 1.5 hours and the mixture was warmed slowly to room temperature over a period of 2 hours. The product was then cooled to $-10°$ C. and 86.1 g. of perfluoroglutaryl chloride was added dropwise over a period of 45 minutes. The mixture became thick so an additional 200 ml. of methylene chloride was added. Then 160 g. of trifluoroacetic anhydride was added at $0°$ C. and after warming the mixture was refluxed for one hour. The reaction mixture was filtered and the filtrate was washed twice with ice water and dried over $CaSO_4$ after removal of the solvent the compound

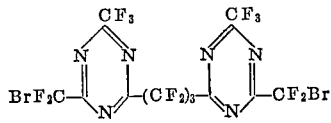

was obtained. B.P. 145 to $147°$ C./6.5 min. $n_D^{25}$ 1.4042.

A mixture of 4.5 g. of this material and 33 g. of Hg was heated 18 hours at $250°$ C. to give a polymeric material of the formula

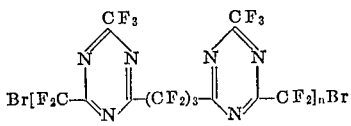

Example 11

59.5 g. of perfluorosebaconitrile $N\equiv C(CF_2)_8C\equiv N$ was added to 500 ml. of anhydrous $NH_3$ at $-70°$ C. The mixture was warmed to $-33°$ C. and the ammonia was allowed to evaporate overnight. The white solid residue was suspended in 1000 ml. of methylene chloride. After cooling to $0°$ C. 210 g. of bromodifluoroacetonitrile was added and the mixture stirred for five rays. To the resulting solution was added 135 g. of trifluoroacetic anhydride. The reaction mixture was stirred for seven hours, washed three times with 1000 ml. portions of ice water and dried over $CaSO_4$. The solvent was removed and the residue was twice distilled to give the compound

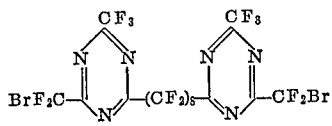

B.P. 152 to $54°$ C. at 1.1 mm.

54.7 g. of the material was mixed with 900 g. of Hg and heated in a quartz flask at $120°$ to $140°$ C. for 4 hours while subjected to ultraviolet radiation. The excess Hg was decanted and the residue heated to $280°$ C. to remove remaining Hg and mercury salts. A dark polymeric material was obtained having the formula

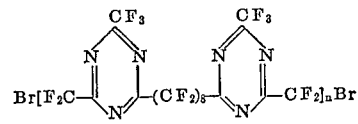

That which is claimed is:

1. The process of comprising condensing a triazine reactant of the formula

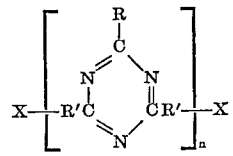

by heating it at a temperature of at least $30°$ C. in the presence of mercury, where $n$ has a value of at least 1,
R is a monovalent perfluorohydrocarbon radical of no more than 12 carbon atoms,
R' is a divalent perfluoroalkylene radical, and
X is a bromine or iodine.

2. The process of claim 1 where R' is difluoromethylene.
3. The process of claim 1 where R is trifluoromethyl.
4. The process of claim 1 where X is bromine.
5. The process of claim 1 where $n$ is 1.
6. The process of claim 1 where the condensation takes place in the presence of a minor amount of at least one compound selected from the group consisting of

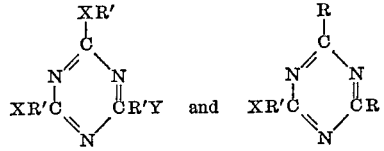

where R, R', and X are as defined in claim 1.

7. The process of claim 1 wherein said triazine is heated to a temperature of at least $150°$ C.

References Cited

UNITED STATES PATENTS

| | | | |
|---|---|---|---|
| 3,086,946 | 4/1963 | Brown | 260—248 XR |
| 3,218,270 | 11/1965 | Delman et al. | 260—2 |
| 3,354,204 | 11/1967 | Dorfman et al. | 260—248 XR |
| 3,369,002 | 2/1968 | Griffin | 260—248 XR |

HENRY R. JILES, *Primary Examiner.*

JOHN M. FORD, *Assistant Examiner.*

U.S. Cl. X.R.

117—138B; 204—158; 252—50; 260—2, 775